United States Patent [19]

Odenbrand et al.

[11] Patent Number: 4,847,058
[45] Date of Patent: Jul. 11, 1989

[54] PROCESS FOR PURIFYING FLUE GASES FROM NITROGEN OXIDES

[75] Inventors: Ingemar Odenbrand; Jan Brandin, both of Lund; Lars Andersson, Sjöbo; Sten Lundin, Lund, all of Sweden

[73] Assignee: Eka Nobel AB, Surte, Sweden

[21] Appl. No.: 169,026

[22] Filed: Mar. 16, 1988

[30] Foreign Application Priority Data

Mar. 20, 1987 [SE] Sweden ................................ 8701159

[51] Int. Cl.$^4$ .......................... B01J 8/00; C01B 17/00
[52] U.S. Cl. .................................................... 423/239
[58] Field of Search ............................ 423/239, 239 A

[56]  References Cited

U.S. PATENT DOCUMENTS

| 4,157,375 | 6/1979 | Brown et al. | 423/239 |
| 4,350,670 | 9/1982 | Matsuda et al. | 423/244 |
| 4,742,037 | 5/1988 | Baiter et al. | 423/239 |
| 4,744,967 | 5/1988 | Brand et al. | 423/239 |

FOREIGN PATENT DOCUMENTS

| 208434 | 1/1987 | European Pat. Off. . |
| 1667775 | 3/1972 | Fed. Rep. of Germany . |
| 2555189 | 7/1976 | Fed. Rep. of Germany . |
| 3430870 | 2/1986 | Fed. Rep. of Germany . |
| 442859 | 2/1986 | Sweden . |

OTHER PUBLICATIONS

Applied Catalysis 18 (1985) 335-352 "Catalytic Reduction of Nitrogen Oxides".

Primary Examiner—Gregory A. Heller
Attorney, Agent, or Firm—Fred Philpitt

[57] ABSTRACT

Nitrogen oxide containing flue gases are purifyed by being subjected to an oxidation/reduction by means of a catalyst material, which comprises vanadium pentoxide on a support material. The purification is carried out in two separate steps, at which the content of nitrogen oxide in the flue gases are oxidized by means of a mordenite catalyst in the first step and are reduced by means of a catalyst of vanadium pentoxide on an acidic support material in the second step.

21 Claims, 5 Drawing Sheets

PROCESS FOR PURIFYING FLUE GASES FROM NITROGEN OXIDES

Nitrogen oxides are formed, inter alia, during combustion of fossil fuels due to oxidation of the molecular nitrogen in the combustion air, and also due to oxidation of nitrogen chemically bonded in the fuel. Nitrogen oxides also occur in flue or exhaust gases from nitric acid production plants. It is known that nitrogen oxides are a big pollution source, and various catalysts and methods for removing such nitrogen oxides from flue gases have previously been suggested. As an example, mention may be made of U.S. Pat. No. 4,157,375, which discloses a catalyst material based upon a combination of zeolite and transition metal, provided on a support in the form of, for example, a honeycomb structure. German Offenlegungsschrift No. De-A-2,555,189 discloses a method of producing a vanadium catalyst intended for the selective reduction of nitrogen oxides and carried by a support, such as alumina.

From C U Ingemar Odenbrand, Sten T Lundin and Lars A H Andersson, "Catalytic Reduction of Nitrogen Oxides", Applied Catalysis, 18 (1985) pp 335–352 (Elsevier Science Publishers, Amsterdam) is known that nitrogen oxide can be selectively reduced with $NH_3$ by means of a catalyst of vanadium pentoxide on a support of coprecipitated silica and titania. However, this known process for reduction of nitrogen oxides has appeared not to be fully effective at use in an industrial scale and in many cases the expected extent of reduction cannot be obtained.

One object with the present invention is therefore to provide a process, by which the treatment of nitrogen oxide containing flue gases and exhaust gases can be controlled in such a way that the reduction of the nitrogen oxides is considerably higher than by known processes.

It has been found that a considerable improvement of the reduction of nitrogen oxides can be obtained by the use of vanadium pentoxide on a support if the purifying process is carried out as a two step process, by which the content of nitrogen oxides in the flue gases is oxidized in a first step by means of an oxidation catalyst and in a second step by means of a catalyst of vanadium pentoxide on an acidic support.

As follows from the description below it is possible, by a separate NO-oxidation followed by a $NO_x$-reduction, to achieve a considerable increase of the reduction within the entire usable temperature range. The improvement in comparison with only one reaction step is greatest at a low temperature to gradually decrease with rising temperatures. A great advantage of the process according to the invention, by which the NO-oxidation and the $NO_x$-reduction are carried out in two separate steps with an intervening addition of $NH_3$, is that a possibility is obtained to operate the two reactions at the same temperature or at different temperatures so that a possibility is obtained to optimize the reaction conditions, particularly the temperature, for the two reaction steps. The process also provides a possibility of placing the two reactors within different parts of a flue gas system.

Another advantage of the invention is that the two step process also gives a possibility of counteracting a possible detrimental influene of $SO_x$ on the $NO_x$-reduction. Thus it can be possible to combine the oxidation of NO and $SO_2$ with an intervening separation of $SO_x$, followed by a reduction of $NO_x$. Such a combined treatment can, however, give the effect of consuming $NO_2$ in the $SO_x$-separation, if $NO_2$ is not produced in excess. Another alternative for the use of the process according to the invention is to operate the $NO_x$-reduction at a temperature, which prevents the formation of $NH_4HSO_4$, which might clog the catalyst. Depending on the choice of oxidation catalyst the NO-oxidation can be operated selectively or together with the $SO_2$-oxidation. Interesting is also that the $SO_2$-oxidation will facilitate the separation and handling of $SO_x$. By the two step process according to the invention the $NO_x$-reduction is improved and an increased flexibility is obtained concerning the choice of technique in a total flue gas purification.

The characteristics of the invention are stated in the patent claims.

The invention will be described in more detail below with reference to the accompanying drawings and in accordance with the examples given.

EXAMPLE 1

Figure 1:
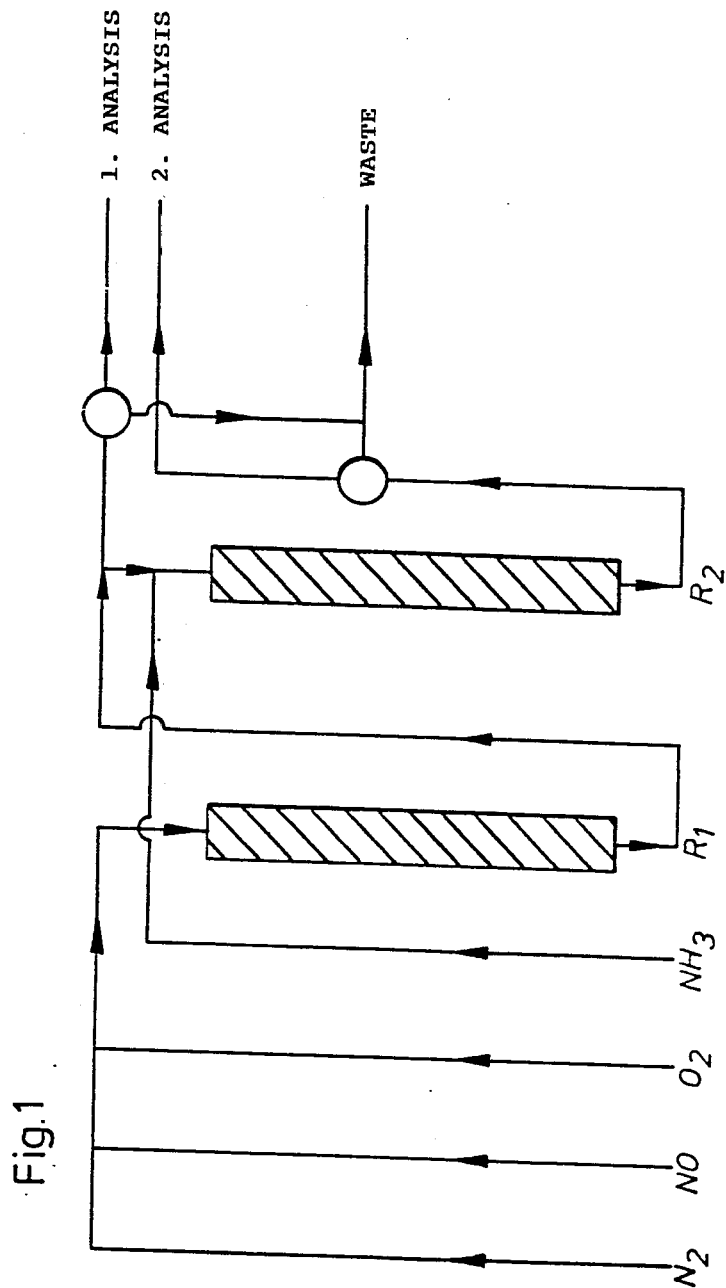
FIG. 1 shows a flow chart for an experimental arrangement for the performance of the process according to the invention.

In this example an experimental arrangement was used, which is schematically shown in FIG. 1 and which comprises a first reactor $R_1$, which contained an oxidation catalyst, and a second reactor $R_2$, which contained a reduction catalyst. Separate streams of $N_2$, NO, $O_2$ and $NH_3$ were added.

In the NO-oxidation in reactor $R_1$ 3 g mordenite catalyst (ZEOLON ® 900 H) with a particle size of 0.7–0.85 mm were used. The gases from reactor $R_1$ comprised NO and $NO_2$ and were mixed with $NH_3$ before the introduction into reactor $R_2$. The oxidation in reactor $R_1$ was operated at a load of 13,000 $m^3$/ton.h (i.e. 13,000 $m^3$ flue gases at NTP per ton catalyst and per hour). The $NO_x$-reduction in reactor $R_2$ was carried out over a catalyst, which consisted of 20% per weight of $V_2O_5$ on $SiO_2$-$TiO_2$. The amount of catalyst in reactor $R_2$ was 0.1 g and the catalyst had a particle size of 0.7–0.85 mm. The reduction was operated at a load of 550,000 $m^3$/ton.h. The temperature was varied within the range of 150°–400° C. In the experiment the concentrations of the gases involved were as follows: Reactor 1 NO=750±30 ppm and $NH_3$=700±40 ppm.

Samples were taken under stationary conditions and analyses were carried out with an $NO_x$-meter of a chemiluminiscense type (Beckman model 955). The different loads in the oxidation and reduction steps, respectively, are determined by the requirements of an appropriate level of conversion in the different steps.

The following series of tests are shown:

Series 1

Reactor 1 loaded with an oxidation catalyst and reactor 2 empty; in order to measure the oxidation in reactor 1 and the $NO_x$-reduction in an empty reactor.

Series 2

Reactor 1 and 2 loaded with mordenite catalyst and vanadium catalyst respectively; in order to measure the $NO + NO_2$-reduction in reactor 2.

Series 3

Reactor 1 empty and 0.1 g $V_2O_5$-catalyst in reactor 2; in order to measure the NO-reduction without $NO_2$ involved in reactor 2.

Series 4

NO-reduction in reactor 2 with 0.1 g $V_2O_5$; in order to determine the degree of reduction at an optimal $NO/NO_2$-ratio.

Figure 2:
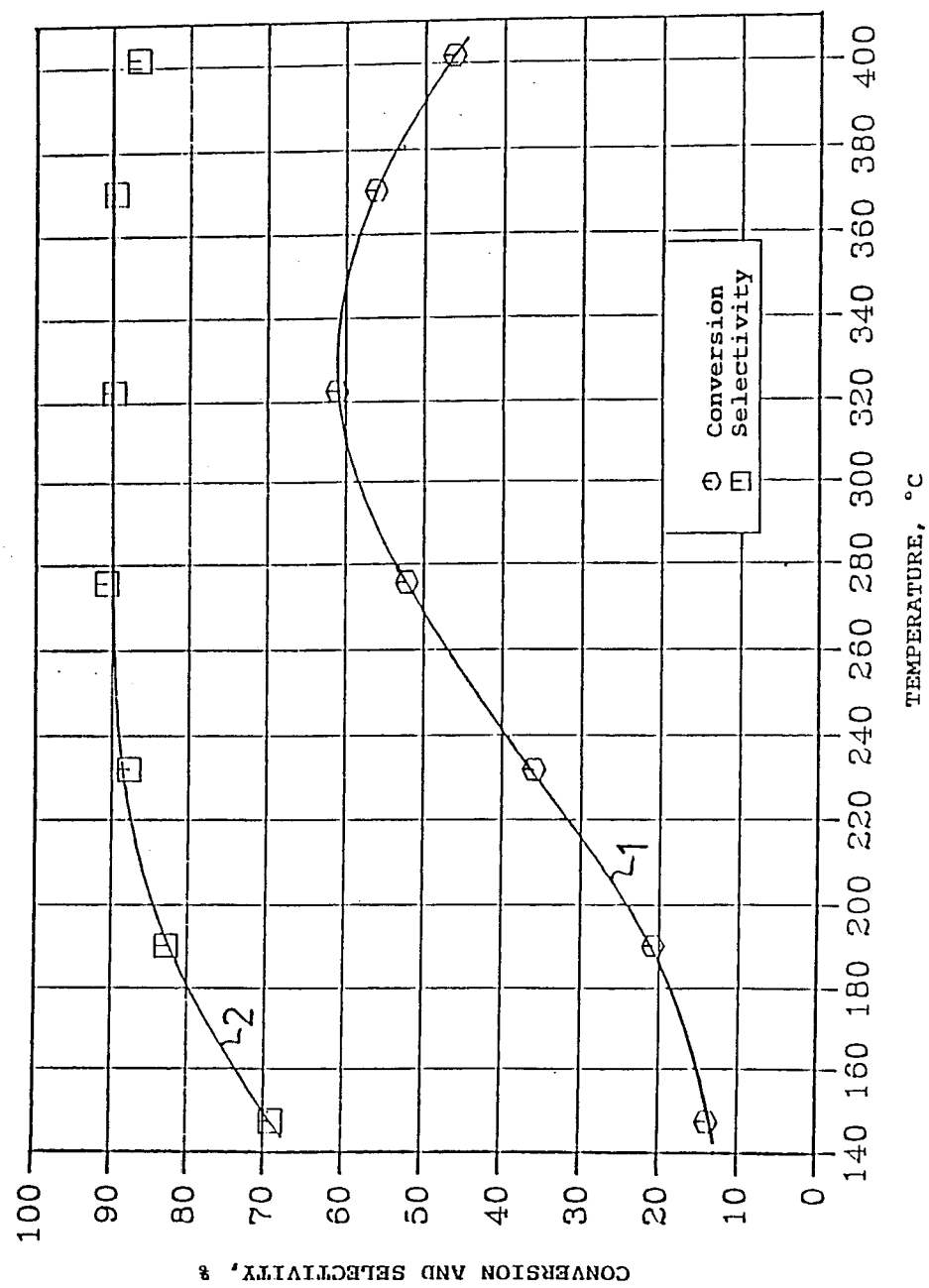
FIG. 2 shows a diagram over the temperature dependence of the $NO_2$-selectivity and NO-conversion in an oxidation by a mordenite catalyst.
Figure 3:
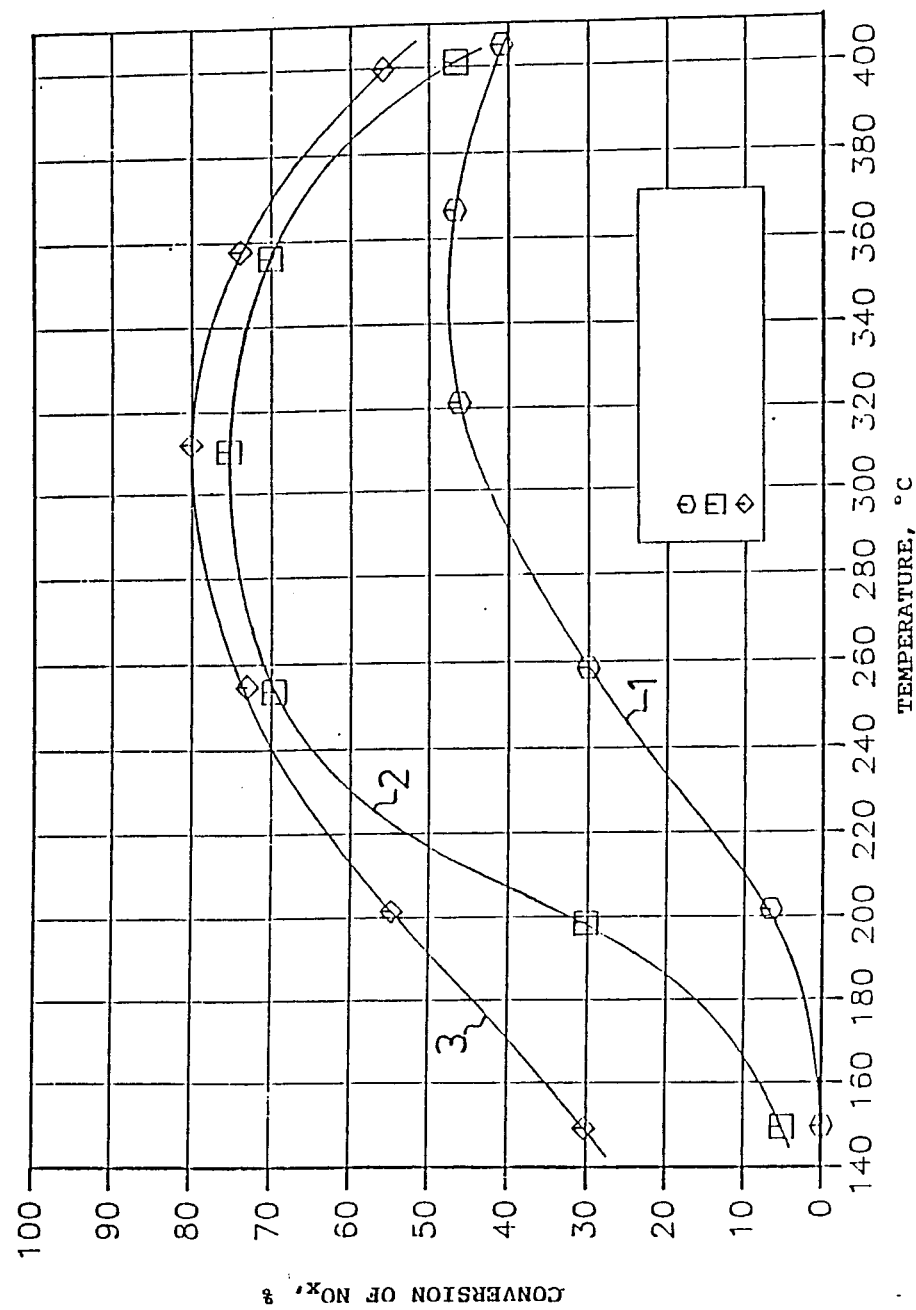
FIG. 3 shows a diagram over the $NO_x$-conversion as a function of the temperature in one bed and in two bed processes for the reduction of nitrogen oxides.

This example serves to illustrate how the conversion of the reduction and the oxidation varies with the temperature when utilizing two reactors. The experimentally measured values are shown in table 1. Table 2 shows interpolated values at defined temperatures. The results are illustrated in FIG. 2 and 3. In FIG. 3 curve 1 gives the conversion of NO with $NH_3$ in a one bed system as a function of the temperature. The results from a two bed system according to the invention are shown with curve 2, while results at optimal conditions in the process according to the invention are shown with curve 3. From the results in the table there can also be observed the improvement, which is obtained with a two bed system in comparison with a one bed system. As appears from the table the effect is greatest at lower temperatures, but at such temperatures the measured improvement is also considerably inferior to what can optimally be obtained. At temperatures of 260°-380° C. such a strong oxidation in catalyst bed 1 is obtained that the two bed system is working at almost optimal conditions.

From table 2 also appears the results from the oxidation of NO to $NO_2$. In FIG. 2 curve 1 shows the conversion and curve 2 shows the portion of NO being converted to $NO_2$ at the oxidation. The experimental support for FIG. 2 is shown in table 3. An optimal temperature range for the oxidation with this catalyst is 280°-380° C. When using other oxidation catalysts than mordenite a shift of the temperature towards the lower direction can be obtained.

The results given in tables 1-3 and FIG. 2 and 3 show that a separate NO-oxidation, followed by a $NO_x$-reduction, gives a strong increase of the reduction in the whole temperature range. The improvement in comparison with only one reaction step in greatest at a low temperature to gradually decrease with raising temperatures. The $NO_x$-reduction at an optimal $NO_2/NO_x$-ratio has been inserted for comparison (curve 3).

From tables 1-3 and FIG. 2 and 3 can be noticed that an NO-oxidation over mordenite shows a conversion of up to 60% at 310°-350° C. The selectivity varies within the range of 70-90% within the temperature interval of 150°-400° C. In the temperature interval of 220°-370° C. the selectivity is 89±2%. Experiments have shown that $V_2O_5/SiO_2$-$TiO_2$ as an oxidation catalyst gives a selectivity of 70±10% at a maximal NO-conversion of 8% at a flue gas load of 26,000 m³/ton.h. It is therefore obvious that an oxidation over mordenite (ZEOLON® 900H) gives a considerably better result with both higher selectivity and higher conversion at the same reaction conditions. By separate steps for oxidation and reduction there is thus a possibility to get a considerably higher final degree of reduction.

In this example the reaction conditions were such that the final degree of reduction was about 80%. By increasing the amount of catalyst or decreasing the space velocity in bed 2, however, the degree of reduction can be increased up to 100%.

EXAMPLE 2

Figure 5:
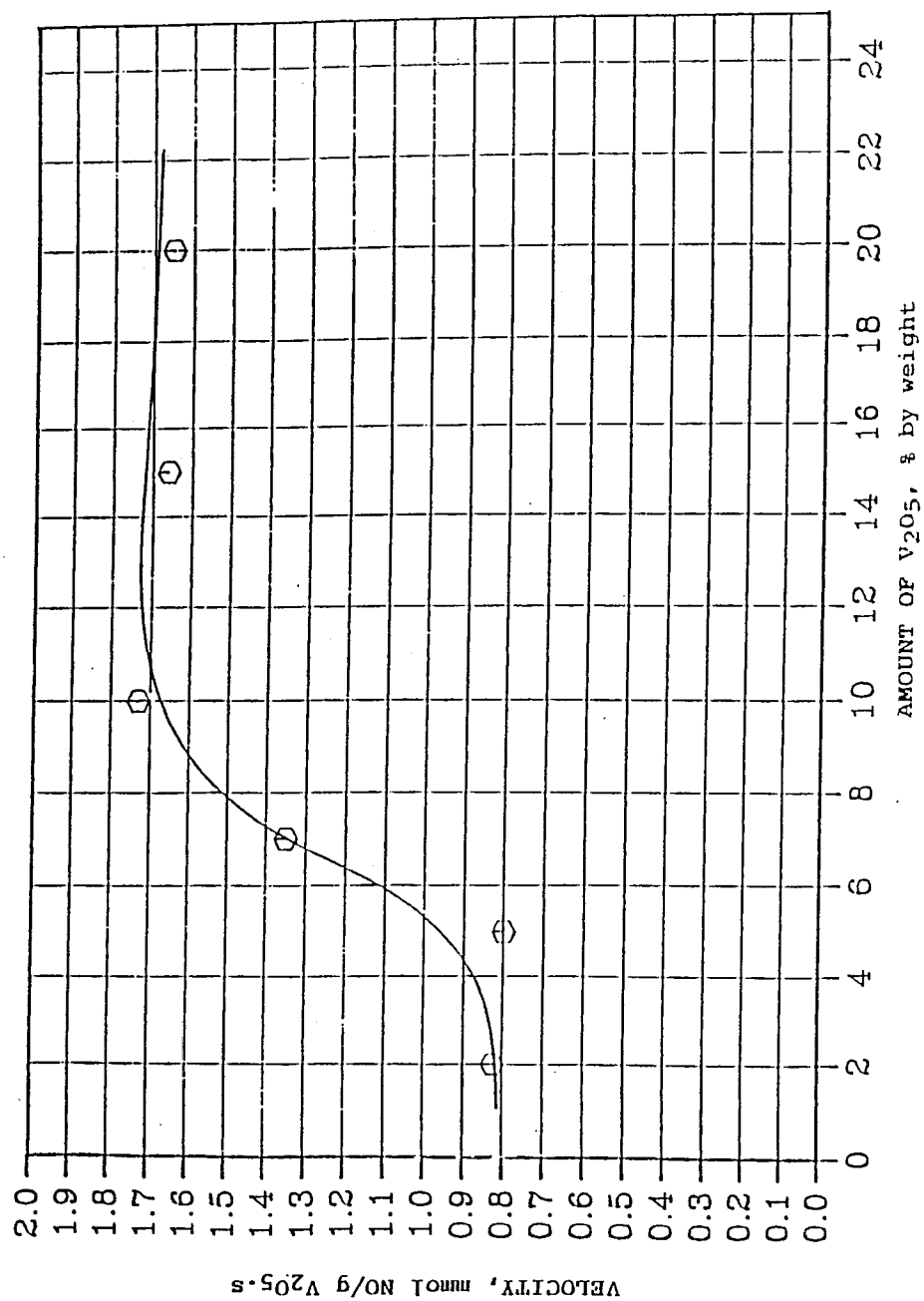
FIG. 5 shows a diagram over the reduction of NO as a function of the amount of $V_2O_5$ in the reduction catalyst in an example according to the invention.

In this example the influence of the $V_2O_5$-amount on the reduction of NO with the aid of $NH_3$ was investigated. As appears from table 4 and FIG. 5 an improvement of the reduction at $V_2O_5$-amounts over 5% is obtained and the optimal use of the vanadium pentoxide is obtained at amounts over 9%. As appears from the fourth column in table 4 $V_2O_5$ will not be fully utilized at higher $V_2O_5$-amounts and for practical and economical reasons the preferred amount in the catalyst is therefore 7-20% per weight.

EXAMPLE 3

Figure 4:
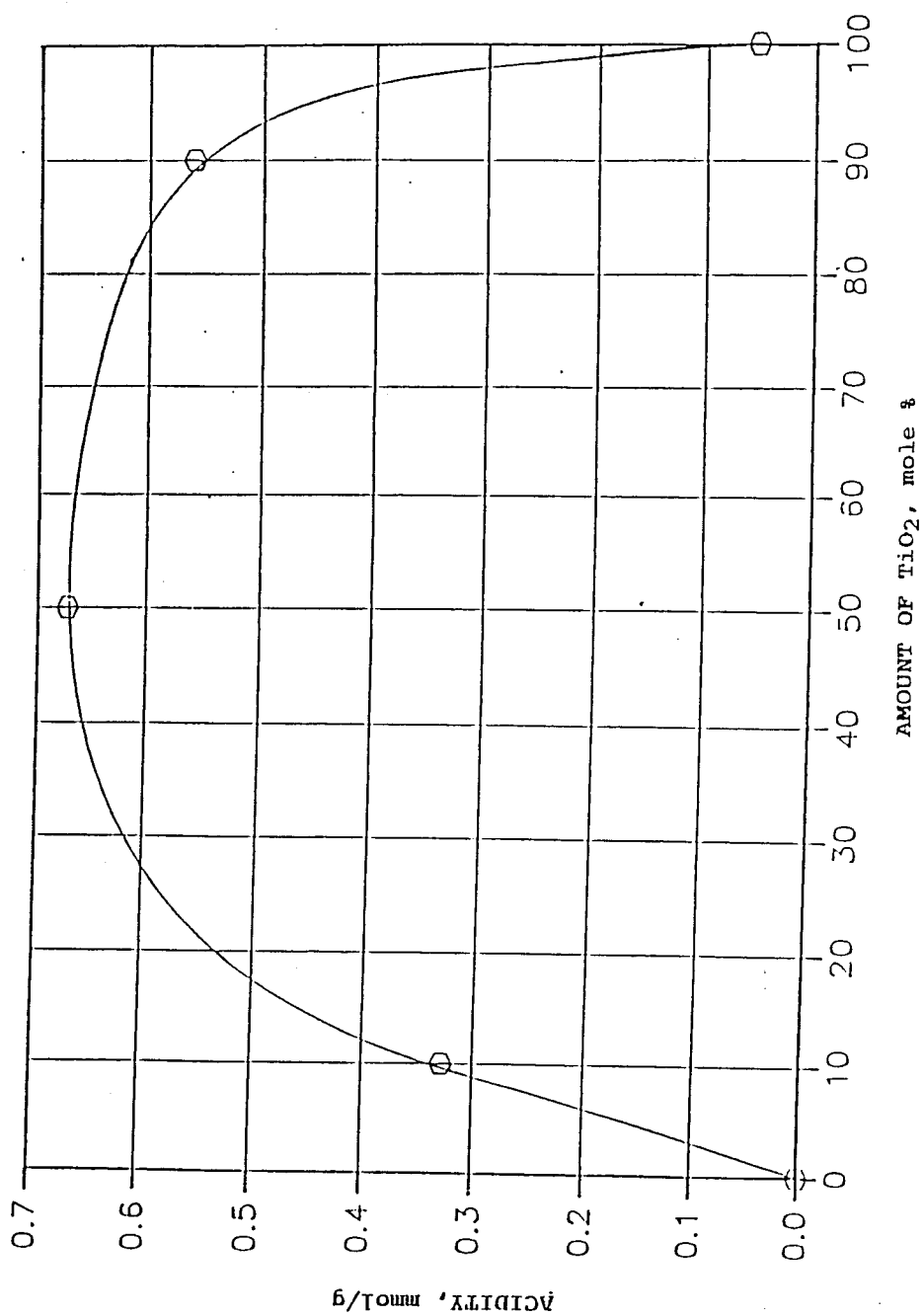
FIG. 4 shows a diagram over the acidity of a support consisting of $SiO_2$ and $TiO_2$ as a function of the amount of $TiO_2$.

This example serves to illustrate the influence of the $TiO_2$-amount on the acidity of the support material. The results are given in table 5 and FIG. 4. From the results it is evident that the highest acidity is obtained at 50 mole percent of $TiO_2$. Experiments have shown that compositions of 30-80% $TiO_2$ and the remaining part $SiO_2$ are working best.

TABLE 1

Reduction of NO with $NH_3$. Comparison between different processes

| One bed with $V_2O_5$ (curve 1) | | Two beds (curve 2) | | Two beds, optimum (curve 3) | |
|---|---|---|---|---|---|
| Temp. (°C.) | Conversion (%) | Temp. (°C.) | Conversion (%) | Temp. (°C.) | Conversion (%) |
| 149.6 | 0.00 | 149.4 | 5.03 | 149.2 | 30.27 |
| 201.8 | 6.61 | 198.6 | 30.20 | 201.6 | 54.74 |
| 258.4 | 30.08 | 253.6 | 69.69 | 254.8 | 73.15 |
| 321.2 | 46.23 | 310.6 | 75.37 | 312.3 | 80.11 |
| 366.6 | 46.77 | 356.3 | 70.15 | 358.0 | 73.95 |
| 404.8 | 40.89 | 401.0 | 46.63 | 399.8 | 55.93 |

TABLE 2

Comparison between one bed and two bed systems at a reduction of NO with $NH_3$

| Temperature °C. | Only one bed of mordenite (1) Conversion of NO to $NO_2$ | Only one bed of $V_2O_5$ (2) Conversion | Two beds, experimentally (3) | | |
|---|---|---|---|---|---|
| | | | Conversion | Improvement obtained in comparison with one bed of $V_2O_5$ | Ratio of $NO_2:NO$ obtained at oxidation in the first bed |
| 180 | 0.146 | 0.030 | 0.200 | 6.660 | 0.180 |
| 220 | 0.275 | 0.150 | 0.460 | 3.070 | 0.370 |
| 260 | 0.421 | 0.300 | 0.720 | 2.400 | 0.610 |
| 300 | 0.526 | 0.420 | 0.760 | 1.810 | 1.140 |
| 340 | 0.547 | 0.475 | 0.730 | 1.540 | 1.230 |
| 380 | 0.482 | 0.460 | 0.600 | 1.340 | 0.880 |

| Temperature °C. | Two beds at optimum conditions (4) | |
|---|---|---|
| | Conversion | Improvement obtained in comparison with one bed of $V_2O_5$ |
| 180 | 0.450 | 15.000 |
| 220 | 0.620 | 4.130 |
| 260 | 0.745 | 2.500 |
| 300 | 0.800 | 1.900 |
| 340 | 0.780 | 1.640 |

TABLE 2-continued

Comparison between one bed and two bed systems at a reduction of NO with NH₃

| | | |
|---|---|---|
| 380 | 0.665 | 1.490 |

(1) The product of the selectivity and the conversion according to FIG. 2
(2) Curve 1 in FIG. 3
(3) Curve 2 in FIG. 3. The first bed is mordenite, the second bed is V₂O₅ on SiO₂ + TiO₂. No control of the oxidation in the first bed.
(4) Curve 3 in FIG. 3. The first bed is mordenite, the second bed is V₂O₅ on SiO₂ + TiO₂. Control of the oxidation in the first bed so that the gas flow to the second bed contained NO₂ and NO in the molar ratio of 1:1.

TABLE 3

Oxidation of NO to NO₂

| Temperature (°C.) | Converted NO (%) | Selectivity to NO₂ (%) |
|---|---|---|
| 147.4 | 13.91 | 69.01 |
| 190.5 | 20.78 | 82.79 |
| 232.2 | 35.99 | 87.75 |
| 275.9 | 52.19 | 90.74 |
| 322.6 | 61.15 | 89.78 |
| 370.4 | 56.28 | 89.61 |
| 401.8 | 46.40 | 86.69 |

TABLE 4

Influence of V₂O₅-amount on the reduction of NO with NH₃

| V₂O₅ by weight | g V₂O₅/g kat. | NO reaction speed mmole/g cat · s | NO reaction speed mmole/g V₂O₅.s |
|---|---|---|---|
| 2.00 | 0.02 | 0.0165 | 0.825 |
| 5.00 | 0.05 | 0.0400 | 0.800 |
| 7.00 | 0.07 | 0.0945 | 1.350 |
| 10.00 | 0.10 | 0.1730 | 1.730 |
| 15.00 | 0.15 | 0.2490 | 1.660 |
| 0.00 | 0.20 | 0.3300 | 1.650 |

TABLE 5

Acidity in coprecipitated SiO₂ - TiO₂

| Acidity mmole/g | TiO₂ mole |
|---|---|
| 0.000 | 0 |
| 0.320 | 10 |
| 0.672 | 50 |
| 0.560 | 90 |
| 0.052 | 100 |

We claim:

1. A process of purifying flue gases from nitrogen oxides which comprises
   (a) contacting the flue gases in a first step with an oxidation catalyst comprising mordenite at a temperature of 150°–400° C and at a space velocity of 2000–5000 m³/ton.h.
   (b) in a second step admixing the treated flue gases from step (a) with ammonia in the ratio of NH₃/NOₓ of 0.9–1.2 and contacting the admixture with a reduction catalyst comprising a vanadium pentoxide on an acidic support at a temperature of 150°–400° C., at a space velocity of 10,000–650,000 M³/ton h. the oxidation in step (a) being controlled so that the flue gases resulting from the first step, when they are brought into contact with the catalyst in the second step, comprise 40–60 mole percent NO₂ and 60–40 mol percent NO, based on the total amount of NO and NO₂ the support material for the vanadium pentoxide consisting of a coprecipitate of SiO₂ with TiO₂, ThO₂ Al₂O₃ or Z,O₂.

2. A process of purifying flue gases from nitrogen oxides which comprises
   (a) contacting the flue gases in a first step with an oxidation catalyst, comprising mordenite and
   (b) in a second step admixing the treated flue gases from step (a) with ammonia and contacting the admixture with a reduction catalyst comprising a vanadium pentoxide on an acidic support.

3. A process as set forth in claim 1 wherein the oxidation in step (a) is controlled so that the flue gases resulting from the first step, when they are brought in contact with the catalyst in the second step, comprise 40–60 mole percent NO, based on the total amount of NO and NO₂.

4. A process as set forth in claim 1 wherein the oxidation in step (a) is controlled so that the flue gases resulting from the first step, when they are brought in contact with the catalyst in the second step, comprise approximately equal molar parts of nitrogen monoxide and nitrogen dioxide.

5. A process as set forth in claim 1 wherein the oxidation in the first step is carried out at a temperature of 150°–400° C.

6. A process as set forth in claim 5 wherein the oxidation in the first step is carried out at a space velocity of 2,000–50,000 m³/ton.h.

7. A process as set forth in claim 6 wherein the reduction in the second step is carried out at a temperature of 150°–400° C.

8. A process as set forth in claim 7 wherein the reduction in the second step is carried out at a space velocity of 10,000–650,000 m³/ton.h.

9. A process as set forth in claim 1 wherein the support material for the vanadium pentoxide consists of a coprecipitate of SiO₂ with TiO₂, ZrO₂, ThO₂ or Al₂O₃.

10. A process as set forth in claim 1 wherein the support material for the vanadium pentoxide contains TiO₂ in an amount of 30–80 mole percent, on the basis of the total amount of TiO₂ and SiO₂.

11. A process as set forth in claim 1 wherein the active part of the reduction catalyst consists of 7–20% by weight of V₂O₅.

12. A process as set forth in claim 1 wherein the oxidation in said first step is carried out at a space velocity of 10,000–25,000 m³/ton.h.

13. A process as set forth in claim 2 wherein the oxidation in the first step is carried out at a temperature of 150°–400° C.

14. A process as set forth in claim 13 wherein the oxidation in the first step is carried out at a space velocity of 2000–50,000 m³/ton.h.

15. A process as set forth in claim 14 wherein the reduction in the second step is carried out at a temperature of 150°–400° C.

16. A process as set forth in claim 15 wherein the reduction in the second step is carried out at a space velocity of 10,000–65,000 m³/ton.h.

17. A process as set forth in claim 2 wherein the support material for the vanadium pentoxide consists of a coprecipitation of SiO₂ with TiO₂, ZrO₂, ThO₂ or Al₂O₃.

18. A process as set forth in claim 2 wherein the support material for the vanadium pentoxide contains TiO₂ in an amount of 30–80 mole percent, on the basis of the total amount of TiO₂ and SiO₂.

19. A process as set forth in claim 2 wherein the active part of the reduction catalyst consists of 7–20% by weight of V₂O₅.

20. A process according to claim 1 wherein the treated flue gases from the first step are mixed with ammonia in the second step in a 0.9–1.2 ratio of NH₃/NOₓ.

21. A process according to claim 2 wherein the treated glue gases from the first step are mixed with ammonia in the second step in a 0.9–1.2 ratio of NH₃/NOₓ.

* * * * *